J. ROGERS.
MACHINE FOR MAKING CONCRETE FENCE POSTS.
APPLICATION FILED DEC. 24, 1912.
1,126,571.
Patented Jan. 26, 1915.
5 SHEETS—SHEET 1.
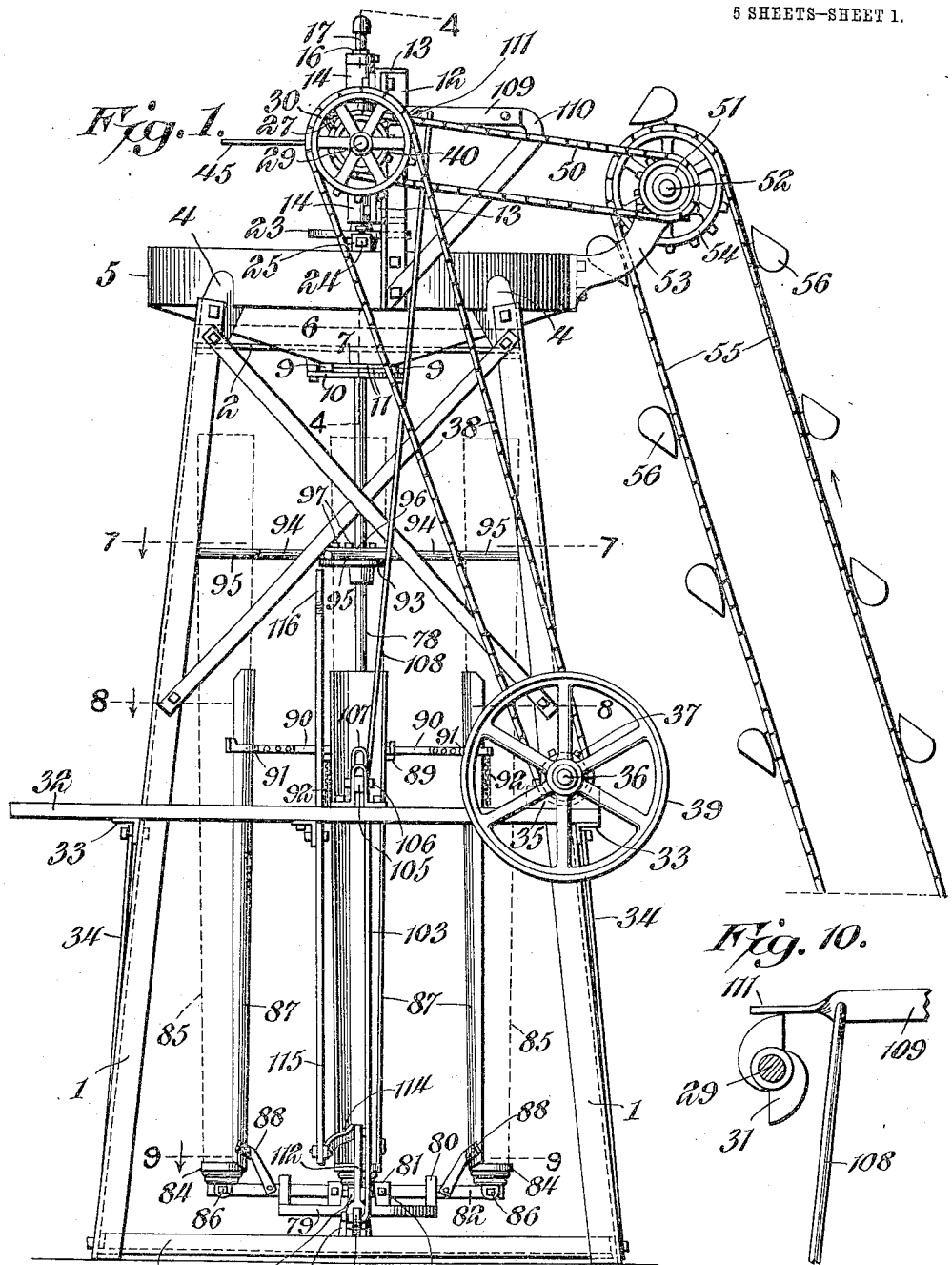

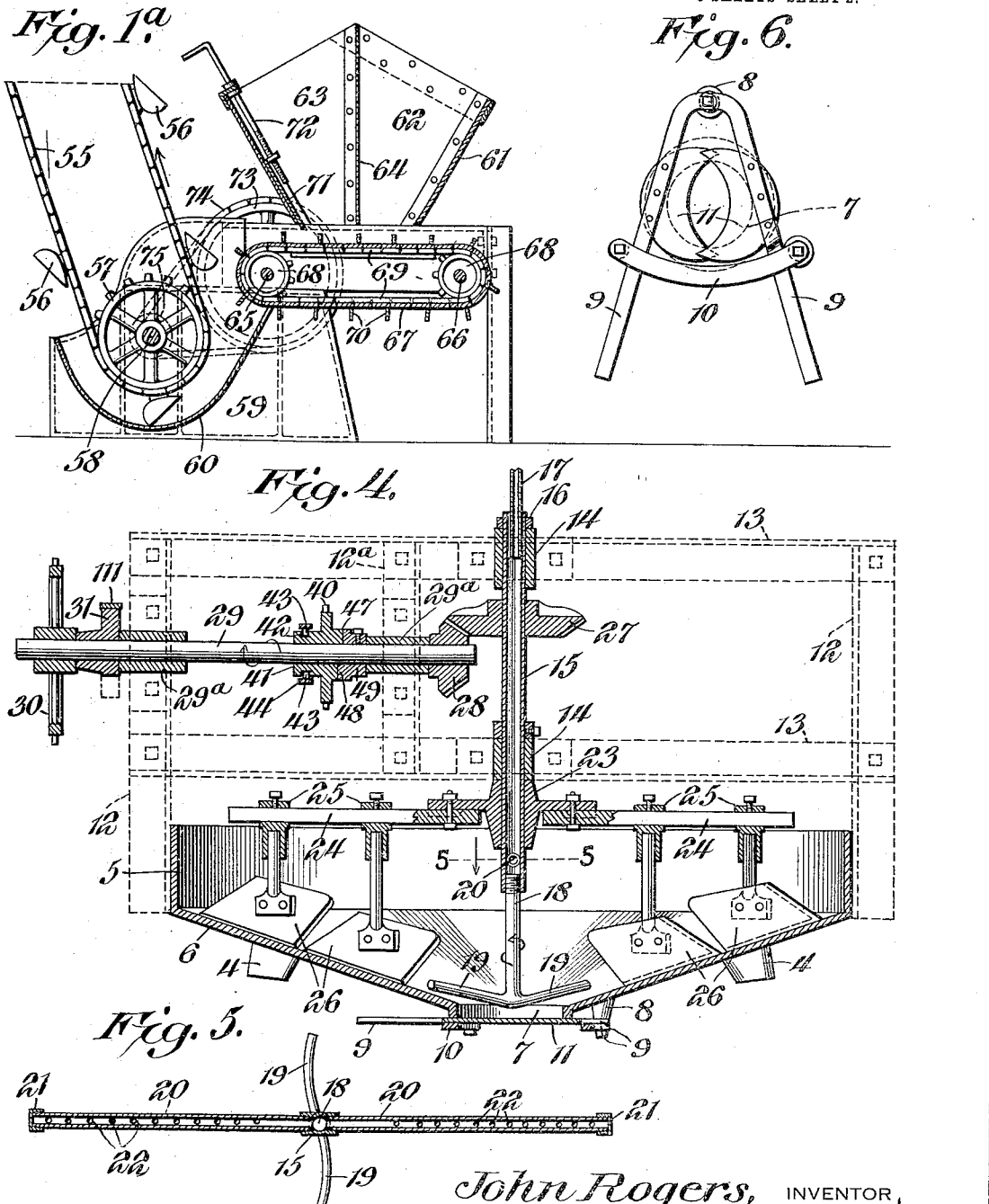

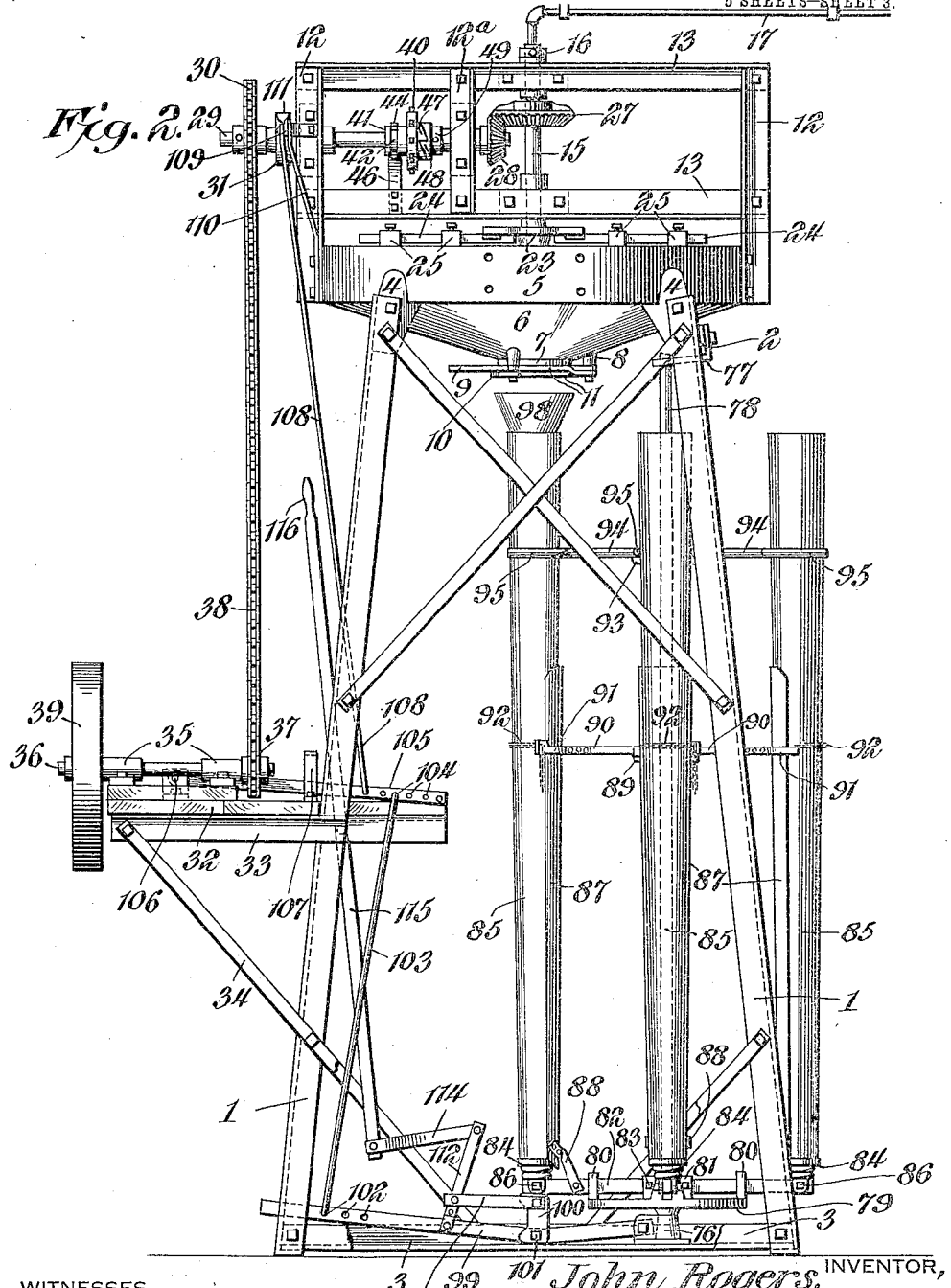

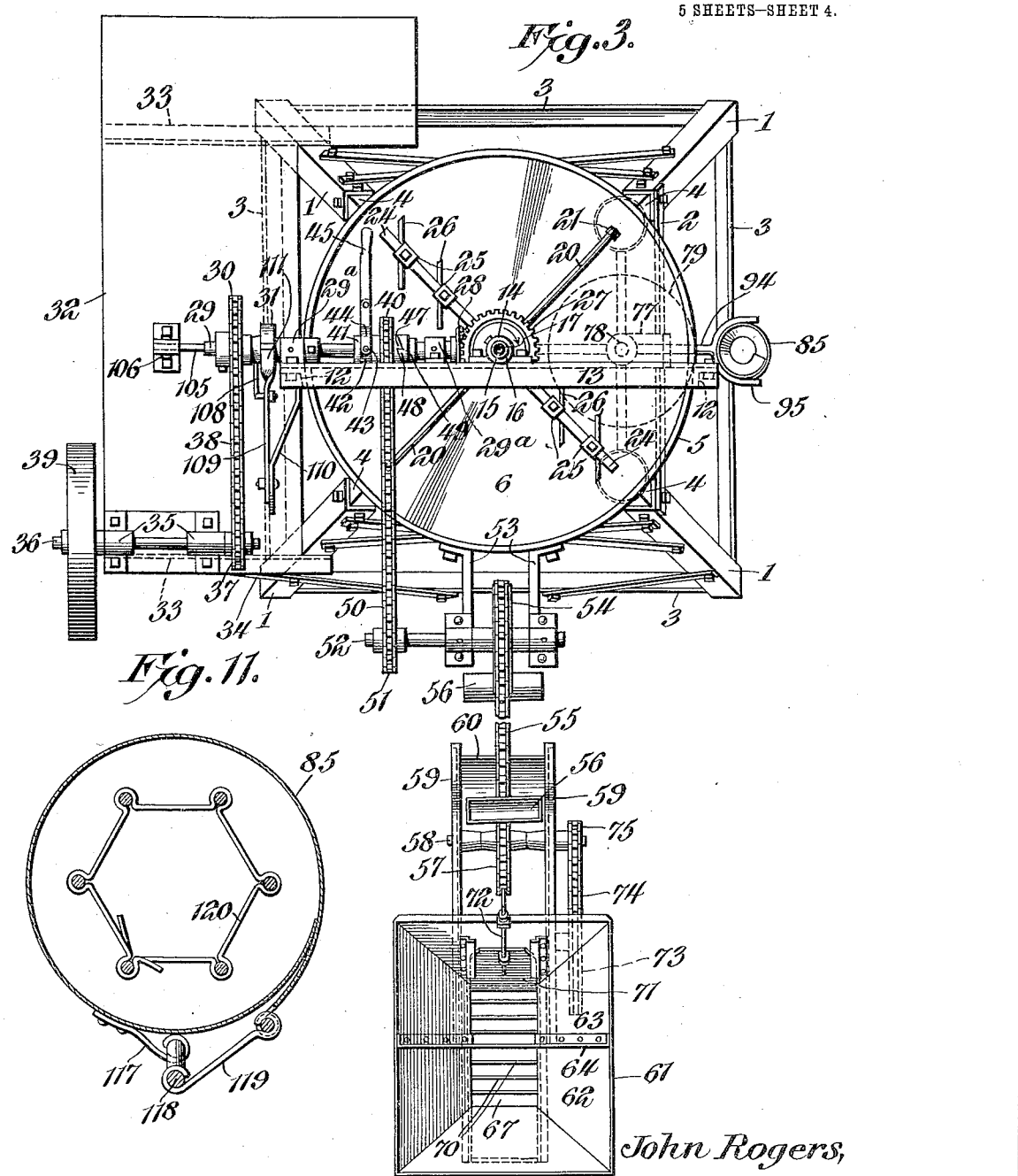

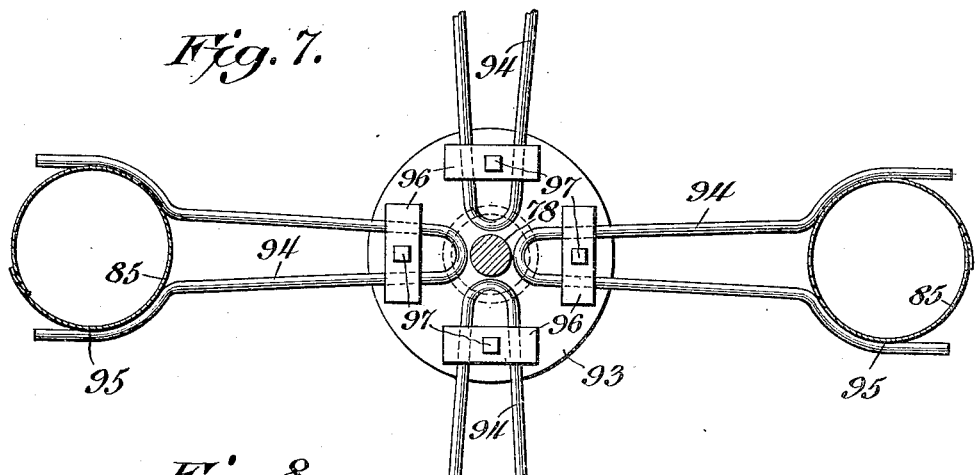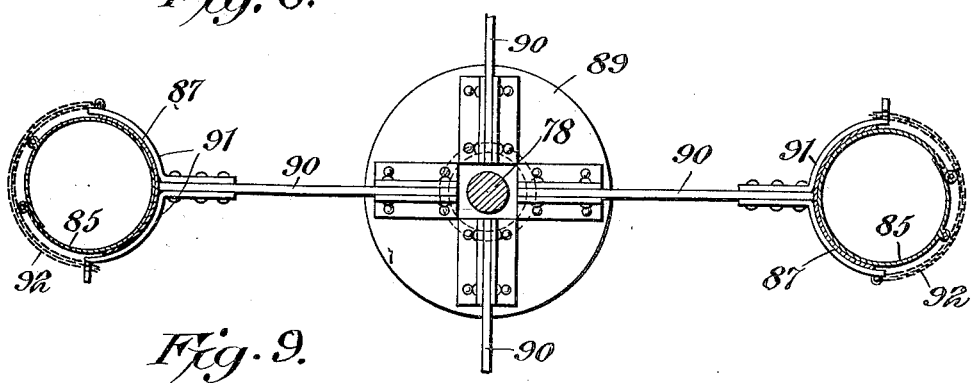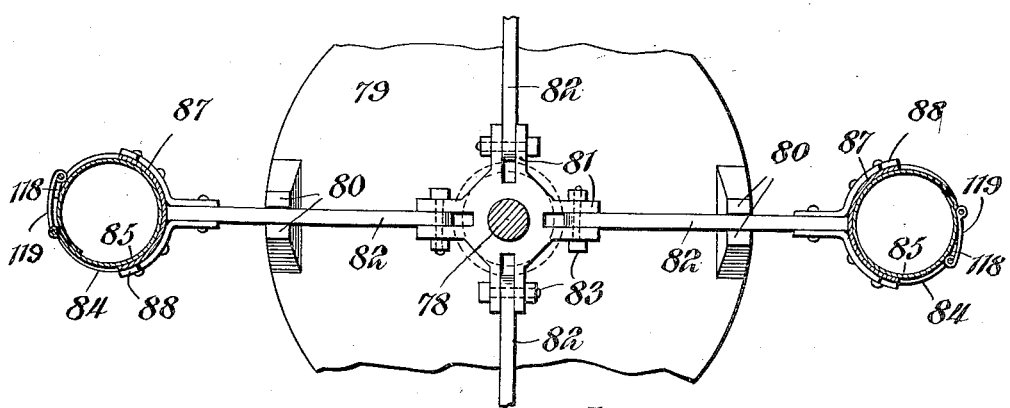

UNITED STATES PATENT OFFICE.

JOHN ROGERS, OF MADISON, WISCONSIN.

MACHINE FOR MAKING CONCRETE FENCE-POSTS.

1,126,571.        Specification of Letters Patent.        Patented Jan. 26, 1915.

Application filed December 24, 1912. Serial No. 738,501.

*To all whom it may concern:*

Be it known that I, JOHN ROGERS, a citizen of the United States, residing at Madison, in the county of Dane and State of Wisconsin, have invented a new and useful Machine for Making Concrete Fence-Posts, of which the following is a specification.

This invention has reference to improvements in machines for making concrete fence posts, and its object is to produce a machine wherein fence posts may be expeditiously made with the concrete mixture well compacted.

In accordance with the present invention the machine is provided with a mixing mechanism whereby the concrete may be prepared of appropriate ingredients, and the machine also includes an appropriate supporting mechanism for fence post molds and has means for measuring the mixture and thoroughly incorporating the water supplied with the other ingredients and then delivering the properly moistened mixture to molds, at the same time agitating the molds in a manner to compact the moistened mixture therein, while additional moistened mixture is supplied until the molds are completely filled ready for removal.

The invention comprises other features which will appear in the detailed description to follow, wherein reference is had to the accompanying drawings forming a part of this specification, but it is to be understood that the invention is not limited to any strict conformity with the showing of the drawings, for it may be changed and modified in various ways without departure from the salient features of the invention.

In the drawings:—Figure 1 is an elevation of the machine with the exception of the mixer. Fig. 1ᵃ is a vertical section of the mixer drawn on the same scale as Fig. 1 and so related thereto that the two figures may be read as one figure. Fig. 2 is an elevation of the structure of Fig. 1 but omitting the transmission to the mixer and also omitting the mixer and the locking means on the molds. Fig. 3 is a plan view of the complete machine with the top water feed pipe in section. Fig. 4 is a section on the line 4—4 of Fig. 1 but drawn on a larger scale. Fig. 5 is a detail section of the sprinkler on the line 5—5 of Fig. 4. Fig. 6 is a bottom plan view of a gate at the bottom of the hopper shown in Fig. 4. Fig. 7 is a detail section on the line 7—7 of Fig. 1, but drawn on a larger scale and omitting distant parts. Fig. 8 is a section on the line 8—8 of Fig. 1 but drawn on a larger scale and omitting distant parts. Fig. 9 is a section on the line 9—9 of Fig. 1 but drawn on a larger scale and omitting distant parts. Fig. 10 is a detail view of a cam structure employed to agitate the molds. Fig. 11 is a cross section of one of the molds drawn on a larger scale than the other figures.

Referring to the drawings, there is shown a frame structure comprising legs 1 and connecting bars 2, 3 at the upper and lower ends of the legs, and this frame structure may be made of angle steel or any other appropriate material. The frame is shown as tapering toward the top, so as to provide an appropriately broad base, but the particular construction of the frame is not material to the present invention.

The upper ends of the legs are attached to lugs 4 on the outer wall of a hopper 5 having a portion of its length substantially circular and a bottom portion 6 tapering funnel-like to a central discharge opening 7. At one side of this opening there is provided a stud 8 to which is pivoted one end of each of two arms 9, the other ends of these arms passing over and being supported by a guide strip 10 fast to the under part of the bottom of the hopper. Fast to each arm 9 is a crescentiform plate 11. The concave sides of these plates are presented one toward the other, so that a gradual opening or closing of the orifice or passage 7 in the bottom 6 of the hopper may be effected as desired.

Erected on the hopper is a frame of angle iron or steel made up of uprights 12 and cross bars 13, of which the cross bars 13 about midway of their length carry bearings 14 for an upright shaft 15 of a length to enter the hopper 5, and this shaft is made hollow. The upper end of the shaft is provided with a collar 16 entered by one end of a pipe 17 which may be assumed to come from an appropriate supply of water. The lower end of the hollow shaft 15 is closed by a stem 18 extending downward to approximately the upper end of the opening 7 and there provided with oppositely extended arms 19 which may be up-bent to conform approximately to the inclination of the bottom 6 of the hopper. Above the stem 18 the hollow shaft 15 carries oppositely directed pipes 20 in substantially radial relation to the axis of rotation of the shaft, and these pipes are closed at the outer ends by caps 21 and have an appropriate number of perforations 22 in a series longitudinal of the pipes, so that water entering the shaft 15 from the pipe 17 will find its way freely into the pipes 20 and escape therefrom through the perforations 22 in a downward direction into the bottom portion 6 of the hopper, and as the shaft is rotated in a manner to hereinafter appear water is distributed throughout the area of the bottom portion of the hopper.

Mounted on the shaft 15 near the bottom thereof is a hub 23. Extending from this hub in radially opposite directions are arms 24, which when the machine is in operation are substantially horizontal and radially adjustable on these arms are heads 25 each carrying a scraping or mixing blade 26 in operative relation to the upper surface of the bottom 6 of the hopper. These blades may engage the bottom member 6 or may be located to move in clearing relation thereto.

Fast to the shaft 15 is a bevel gear 27 with which meshes a bevel pinion 28 on a shaft 29 journaled at 29$^a$ on an appropriate upright 12 and an intermediate upright 12$^a$. The shaft 29 extends beyond the upright 12 on which it is journaled and there carries a sprocket wheel 30 and a cam 31, which cam is shown separately in Fig. 10 as provided with oppositely disposed cam members, so that the cam becomes operative twice during each rotation, but this arrangement may be varied as found desirable.

At an appropriate point on the leg 1 at one side of the frame there is mounted a platform 32 sustained by suitable bars or beams 33 fast to the legs 1 and by braces 34 fast to the beams 33 and the legs 1. This platform may be utilized by a workman or operator, and near one end the platform carries bearings 35 for a counter-shaft 36 having at one end a sprocket wheel 37 connected by a sprocket chain 38 to the sprocket wheel 30, while the other end of the shaft 36 is provided with a pulley 39 by means of which power may be applied to the shaft 36 for driving the mechanism of the device. The pulley 39 constitutes the main driving element and may, therefore, typify any suitable power means whether such power be applied to the shaft 36 by means of a belt and pulley, a sprocket chain, or an electric motor, these all being common and well known interchangeable driving means.

Mounted on the shaft 29 to turn loosely thereon is a sprocket wheel 40 having a hub 41 in which there is formed an annular groove 42 and taking into this groove are pins 43 on a fork 44 on one end of a lever 45 pivotally supported on a post 46 rising from one of the beams 13. The hub 41 is provided at the end remote from the groove 42 with a circular series of clutch teeth 47 arranged to take into other clutch teeth 48 on a hub 49 fast on a shaft 29. The arrangement is such that by an appropriate movement of the sprocket wheel 40 along the shaft 29 it may be coupled up to the shaft through the hub 49 or uncoupled therefrom at will. The sprocket wheel 40 is engaged by a sprocket chain 50 in turn engaging another sprocket wheel 51 mounted on a shaft 52 having journal bearings in brackets 53 fast to and projecting from one side of the hopper 5. The shaft 51 between its journal bearings carries another sprocket wheel 54 about which is extended a sprocket chain 55 carrying buckets 56 for a purpose which will presently appear. The sprocket chain 55 and buckets 56 are so related to the hopper 5 that the buckets are carried over the sprocket wheel 54 and discharge into the hopper 5 and the chain 55 and buckets 56 constitute an elevating conveyer having a rising run on the side remote from the hopper and a return run on the side toward the hopper. The conveyer is so disposed as to reach nearly to the base of the machine where the sprocket chain 55 is carried about another sprocket wheel 57 mounted on a shaft 58 having journal bearings in side frames 59 connected by a shield 60 which may be of sheet metal curved on the axis of the shaft 58 and spaced therefrom so that the buckets of the lowering run of the conveyer will enter the pocket formed by the shield 60 and move along the same about its lowest portion to collect material therefrom and then rise from the pocket filled with suitable material.

In order to feed material to the pocket formed with the shield 60, the side members 59 are appropriately continued and support a hopper 61 of the usual contracted shape toward the bottom, and this hopper is divided into compartments 62, 63 by an intermediate web 64. Mounted on spaced shafts 65 and 66 journaled in the side members 59 is a conveyer belt 67 through the intermediary of sprocket wheels 68 and sprocket chains 69. This conveyer belt is provided with flights 70 and has substantially horizontal upper and lower runs, the upper run being immediately beneath the lower end of the hopper 61 to receive material therefrom and convey the material away from the hopper, the conveyer being so located as to discharge into the pocket formed by the shield 60. That end of the hopper which the conveyer leaves is provided with an adjustable gate 71 controlled by a manipulating rod 72, so that the discharge of material from the hopper may be regulated at will. The shaft 65 is continued beyond one of the supporting members 59 and there carries a sprocket wheel 73 connected by a sprocket chain 74 to another sprocket wheel 75 on the shaft 58. When motion is transmitted from the shaft 29 to the sprocket wheel 40, movement is imparted by the sprocket chain 50 to the shaft 52 which in turn causes the actuation of the elevating conveyer lifting material deposited in the pocket formed by the shield 60 by means of the movement of the conveyer 67 with relation to the hopper 61. Appropriate materials are placed in the compartments 62 and 63, say cement in one compartment and a mixture of sand and gravel or sand alone in the other compartment, and then the travel of the conveyer 67 will cause the material to be conveyed from both compartments and deposited into the pocket formed by the shield 60, while the feed of material from the compartment 63 is readily controlled by the gate 71, wherefore the proper mixture may be obtained. This mixture is a dry mixture, and is in this condition deposited into the hopper 5 where it is agitated by the blades or stirrers 26 and at the same time water is supplied through the sprinkler tubes 20, while any tendency of the material to clog in the passage 7 is prevented by the agitator 19 and the mixed wet material is allowed to escape to any desired extent and at such intervals as is desirable by a proper manipulation of the controlling gates 11.

Journaled at one end in a step bearing 76 carried by a lower cross piece 3 of the frame 1 and in another bearing 77 carried by an upper cross piece 3 of the frame 1 is an upright shaft 78 in eccentric relation to the hopper 5. This shaft has fast thereto adjacent the step bearing 76 a disk 79 or other appropriate structure at the peripheral portion of which are upstanding spaced guides 80 arranged in pairs at substantially equidistant points about the disk. Formed as part of the disk 79 or made fast to the shaft immediately above the disk are radially extended pairs of ears 81 in suitably spaced relation, so that each pair of ears may receive between it one end of an arm 82 pivoted to the ears by a pivot pin or bolt 83 and each arm 82 extends beyond the periphery of the disk 79, entering between a respective pair of guides 80 at an intermediate point of the length of the arm. At the outer end of each arm there is mounted a support 84 of an appropriate size and shape to receive one end of a mold 85 shown in dotted lines in Fig. 1 and in full lines in other figures. For reasons which will hereinafter appear the mold holder or carrier 84 is connected to the respective arm 82 by a pivot pin or bolt 86. Upstanding from each support 84 is a guide and supporting plate 87 suitably concaved in cross section to conform to the cross sectional shape of the mold which in the particular instance under consideration is circular in cross section, but it will be understood that the invention is not limited to the use of a circular mold, for the molds may be of other form. Usually these molds taper from one end toward the other, being designed particularly for the formation of fence posts, but such particular configuration is not at all obligatory, nor is the machine limited in its use to the production of fence posts only.

The ends of the plates 87, which constitute the lower ends thereof since the molds are placed in the upright position when being filled, are supported by braces 88 each fast at one end to a respective plate 87 and at the other end to an appropriate portion of the respective arm 82.

Fast to the shaft 78 at a point adjacent the upper ends of the plates 87 is a head 89 carrying radially disposed arms 90 in number equal to the number of arms 82 and at the outer ends these arms 90 have yoke brackets 91 fast thereto and of a size to receive the corresponding portion of a respective plate 87. One yoke bracket 91 of each arm 90 has a chain 92 or other suitable flexible device connected thereto, while the other arm 91 is shaped at the free end to receive and lock the end of the chain remote from that connected to the first-named yoke bracket 91, so that the mold 85 may be supported by the plate 87 and chain 92 against accidental displacement. At still a higher point on the shaft 78 is another head 93 carrying radially disposed arms 94 each terminating at the outer end in a yoke 95 freely open at the outer end and so disposed as to receive and engage a corresponding mold 85 on opposite sides thereof. In the particular construction shown these arms are in the form of rods bent intermediately upon themselves and held at the intermediate portions by clips 96 made fast to the head 93 by bolts 97, so that a certain amount of adjustment is permitted to accommodate the arms 94 to the upper ends of the molds and at the same time permit a degree of elasticity which will cause the yokes 95 to grip the molds with sufficient friction to in part sustain them. The gripping arms 94 are located so as to engage the molds near what constitutes their upper ends when these molds are in place in the machine in the inverted position.

The supports 84 may constitute closures for the corresponding ends of the molds or other closures may be provided, while those ends of the molds which are at the top when in position in the machine are carried successively beneath the discharge end of the hopper 5 because of the eccentric arrangement of the shaft 78 and when a mold is beneath the discharge end of the hopper a funnel 98 is introduced therein, so that on opening the gate formed by the plates 11 the concrete mixture will be guided into the mold and will readily gravitate to the bottom thereof.

While a mold is being filled, an already filled mold may be removed from the mold carrying devices at a point remote from the position of the mold being filled and an empty mold may be substituted therefor. As soon as a mold has been filled the mold carrier is rotated an appropriate distance to bring the next succeeding empty mold into position beneath the hopper and then the cement mixture may be fed into the mold while a filled mold is being removed.

In the drawings provision is shown for carrying four molds at a time, but such number is not at all mandatory and there may be provision for a less number or a greater number.

During the filling of the mold with the concrete mixture there is no chance for tamping by the introduction of a tamping tool at the receiving end of the mold. Still it is advisable to cause a thorough compacting of the material filled into the mold to produce uniformity in density throughout the molded article. To accomplish this there is provided a jarring means for the mold operative during the filling of the mold with the concrete mixture. To bring this about a lever 99 is pivoted at one end adjacent the bearing 76 and at the other end this lever is continued toward one side of the frame of the machine. In the particular construction shown the lever is bent at a point between its ends and there carries a block 100 pivoted to the lever by a bolt or pin 101, and this block is of such length as to be introducible under the free end of an arm 82 and the block is so located that it may be introducible under the free end of that arm 82 carrying the mold being filled. The free end of the lever 90 is provided with a series of perforations 102 in any one of which may be engaged one end of a link 103, the other end of which is engaged in any one of a series of perforations 104 in an arm 105 having the end remote from the perforations pivoted on a platform 32, as indicated at 106, and in order to steady this arm guide fingers 107 are arranged on the platform 32 at an appropriate point. Engaged in an appropriate one of the perforations 104 is one end of another link 108 rising above the hopper 5 and there connected to an arm 109 pivoted at one end to a bracket 110 fast to one of the uprights 12 and having its other end 111 in the path of and shaped to be engaged by the cam 31 carried by the shaft 29.

Carried by the lever 99 is another lever 112 connected at a point between its ends to one end of a link 113 which in turn has its other end connected to that end of the block 100 remote from the pivot 101. The free end of the lever 112 is connected by a link 114 to one end of a manipulating lever 115 rising above the platform 32 and there pivoted to one of the supports of the platform and above said platform being formed into a handle portion 116 within ready reach of an operator on the platform 32.

When the machine is in operation the shaft 29 is rotating and cam 31 is also rotating, causing a rocking of the arm 109, which rocking movement is transmitted by the link 108 to the arm 105 and from the latter by the link 103 to the lever 99. If the block 100 is located beneath and in engagement with the arm 82 sustaining the mold being filled, then the rocking movement of the arm 109 is participated in by the lever 99 and block 100, so that the mold being filled has imparted to it an up and down movement of which the down movement is abrupt because of the formation of the cam 31, which is shaped to permit the lowering movement of the parts to take place by gravity and this movement is suddenly arrested at its lower limit. This imparts a sudden jar to the filling mold and the parts may be so proportioned that numerous jarring movements are imparted to a mold during the filling operation. The material entering the mold in a wet state therefore becomes thoroughly compacted and the finished article is smooth and substantially solid throughout without unfilled spaces which would be liable to occur were the jarring of the mold omitted. The effect of the jarring may even be superior to ordinary tamping. The extent of the jarring movement is readily regulated by changing the links 103 and 108 with respect to the lever 99 and arm 105, respectively. During the rotation of the mold carrier about the axis of the shaft 78 it may be desirable to move the block 100 out of the path of the arms 82, which may be done by a suitable manipulation of the lever 115, which will carry the free end of the block 100 to a point where it will be out of the path of the arms 82 and when it is desirable to again start the jarring operation the lever 115 is readily manipulated to move the block 100 again into engagement with the arm 82 carrying the mold then beneath the discharge end of the hopper 5.

While no specific construction of the mold is demanded by the machine of the present invention, it is preferred to form each mold of a metal sheet bent into frusto conical form to produce a slight taper and with the long edges of the sheet overlapping. At a point somewhat distant from one long edge of the sheet straps 117 are secured, and in these straps is journaled a cam shaft 118, which by means of eye straps 119 are connected to the other long edge of the mold, so that by a suitable manipulation of the cam shaft the internal diameter of the mold may be enlarged or contracted, as desired, and when in the contracted position the cam shaft automatically locks against any force tending to expand the mold. The intermediate position of the cam shaft is indicated in Fig. 11 where the mold is shown as midway between its largest and smallest diameters and in addition the mold is shown as inclosing a reinforcement structure 120 which it is advisable to introduce into the mold, but which forms no part of the present invention, but is described and claimed in another application filed by me.

What is claimed is:—

1. In a concrete molding machine, an upright carrier for elongated molds having supports at low points for receiving the lower ends of inverted molds and sustaining them in a substantially upright position, outwardly opening forked members at high points on the carrier for receiving the molds, and other outwardly opening forked members at an intermediate point on the carrier in line with the corresponding ones of the low supports and high members and provided with fastening means for preventing escape of the molds laterally therefrom, whereby the molds may be placed with the then lower ends upon the low supports and tilted on said supports until seated in the forked members and in such position secured by the intermediate fastening means.

2. In a concrete molding machine, an elongated carrier for elongated molds having supports at low points for receiving the lower ends of inverted molds and sustaining them in a substantially upright position, outwardly opening forked members at high and intermediate points on the carrier for receiving the molds laterally, and flexible fastening means on the intermediate forked members for preventing escape of the molds laterally from said forked members, and the low supports being mounted for up and down movement, whereby the molds may be placed with their then lower ends upon the low supports and tilted thereon until seated in the forked supports, and then secured by the flexible fastening means and moved up and down in the intermediate and high supports by similar movements of the low supports.

3. In a concrete molding machine, a rotatable carrier for elongated molds having a circular series of supports at the lower end for receiving the lower ends of inverted molds and sustaining them in a substantially upright position, said supports being movable up and down, and circular series of outwardly opening forked members at high and intermediate points on the carrier with the intermediate forked members having chains thereon for embracing the molds to hold them to the forked members against escape in a lateral direction, whereby the inverted molds may be placed with their then lower ends upon the low supports and tilted until seated in the forked supports and there secured by the chains, and may be moved up and down by the low supports through the intermediate and high supports.

4. In a concrete mixing machine, a rotatable mold carrier provided with a circular series of mold supports mounted to rise and fall with respect to the carrier, a lever in underriding relation to the mold supports and held against participation in the rotary movements of the supports, means for moving the lever on a substantially horizontal axis toward and from the mold supports, a support engaging member carried by the lever, and means for moving the engaging member into and out of the paths of the supports irrespective of movements of the lever.

5. In a concrete molding machine, a rotatable mold carrier provided with mold supports mounted to rise and fall thereon, a lever in underriding relation to the mold supports and fixed against participation in rotative movements of the carrier, means for imparting up and down movements to the lever, a block pivotally mounted on the lever, and means for rocking the block on the lever into and out of the path of the mold supports, whereby the mold supports may have an up and down movement imparted thereto by the lever or not at the will of an operator without stopping the movements of the lever.

6. In a concrete molding machine, a rotatable series of mold supports having a range of up and down movement, and means for imparting the up and down movement to the mold supports comprising a lever fixed against rotation in position to be overridden by the mold supports in succession, a block carried by and pivoted upon the lever, means for imparting up and down movements to the lever, and means for moving the pivoted block into and out of the path of the mold supports, said means comprising a lever under the control of an operator, and a series of connecting links connected to the block and to the second lever for moving the block on its pivot into and out of the path of the mold supports to render the first-named lever active or inactive to the mold supports at the will of an operator.

7. In a concrete molding machine, an elongated rotatable carrier for elongated molds having at its lower end a circular series of supports for receiving the lower ends of inverted molds and sustaining the molds in a substantially upright position, a circular series of outwardly opening forked members at a high and at an intermediate point of the carrier for receiving the molds laterally, the forked members of the high series each comprising coacting flexible arms to receive and grip the molds, and flexible fastening means carried by the intermediate series of forked members for holding the molds thereto, whereby the inverted molds may be placed with their then lower ends upon the low supports and tilted into seating relation to the forked supports and secured in place by the intermediate fastening means.

In testimony, that I claim the foregoing as my own, I have hereto affixed my signature in the presence of two witnesses.

JOHN ROGERS.

Witnesses:
 ALFRED T. ROGERS,
 ALICE M. KINNEY.

Copies of this patent may be obtained for five cents each, by addressing the "Commissioner of Patents, Washington, D. C."